Aug. 15, 1961  G. L. HAMBURGER ET AL  2,995,827
AUTOMATIC STEERING APPARATUS FOR VESSELS, VEHICLES
AND OTHER GUIDED BODIES
Filed Aug. 23, 1956
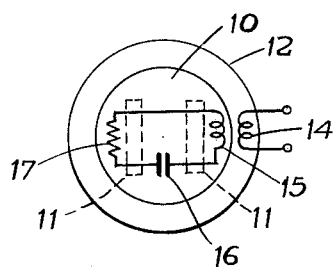
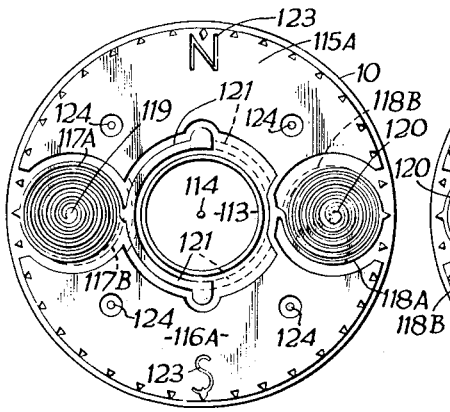 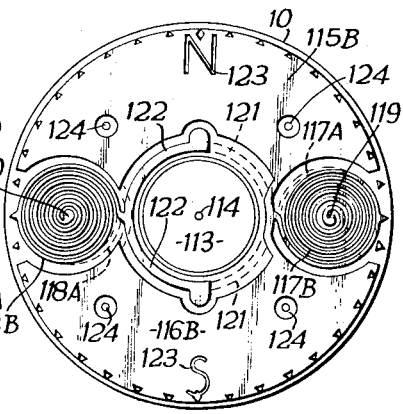
INVENTORS
Gerhart L. Hamburger
Thorlief Robertson
BY
Ralph B. Stewart
ATTORNEY United States Patent Office 2,995,827
Patented Aug. 15, 1961

2,995,827
AUTOMATIC STEERING APPARATUS FOR VESSELS, VEHICLES AND OTHER GUIDED BODIES
Gerhart Lothar Hamburger, Stevenage, England, and Thorlief Robertson, Egersund, Norway, assignors to Hartley Robertson Limited, Egersund, Norway, a company of Norway
Filed Aug. 23, 1956, Ser. No. 605,831
Claims priority, application Great Britain Sept. 13, 1955
14 Claims. (Cl. 33—222)

The present invention relates to automatic steering apparatus for vessels, vehicles and other guided bodies of all kinds including aircraft, cameras and projectiles, which will for example actuate the steering mechanism of the said guided body so that it is brought back on to a pre-set course after a departure from the said course.

The present invention relates in particular to compass cards for use in compasses employed in automatic steering apparatus of the kind referred to, and an object of the present invention to provide a compass card carrying an electric circuit thereon in such manner that the card does not require special testing and correction for balance.

In a preferred embodiment of the invention, the electrical circuit includes a capacitor and in order to facilitate manufacture and to make the best use of the space provided for the circuit on the card, the capacitor includes a capacitive element in the form of a plate section on each face of the insulating sheet, the plate sections being in register when viewed in the direction of the axis of rotation and forming a capacitor section with the sheet serving as a dielectric.

It is particularly advantageous to provide an arrangement in which the circuit elements on each face can be arranged on the card away from the axis of rotation so as to leave the space round said axis free from circuitry. In order to do this the capacitor is preferably in two sections each capacitor section being formed by a capacitive element in the form of a plate section on each face of the insulating sheet, the plate sections of each capacitor section being in register when viewed in the direction of the axis of rotation. To provide a symmetrical arrangement the plate sections on each face of the insulating sheet are arranged on opposite sides of a centre line of the card. So arranged, the capacitive elements on each face preferably take the form of equally dimensioned arcuate plate sections, concentric about the axis of rotation and so disposed and dimensioned as to leave equal diametrically opposite spaces between their adjacent ends.

When the circuit is to be an oscillatory circuit, then one or more inductive elements must be provided on the sheet. In order to maintain the centre of the card free from circuitry the inductive elements preferably take the form of flat spirals located in each of said spaces, the inner end of each spiral element on one face being connected through the sheet to the inner end of the spiral element in register therewith on the other face, the arrangement being such that each pair of interconnected spiral elements together form a single inductor section.

An embodiment of the invention having other advantageous features will now be described by way of example with reference to the accompanying drawings in which:

FIG. 1 is a schematic diagram of a compass showing the electrical connections of the circuit elements mounted thereon and FIGS. 2 and 3 are views of opposite sides of the compass card shown in FIG. 1.

The direction-maintaining device, which indicates a fixed direction for use as a reference direction, consists of a compass card 10 fitted with permanent magnets 11 and floating in a compass bowl 12, the bowl being mounted in a frame in the conventional manner by means of gimbals so that the card and the bowl always remain horizontal. The frame and the compass bowl 12 are rotatable together, coaxially with the compass card, and comprise a direction-indicating device, the position of the bowl and frame about the axis of rotation and relative to the vessel being representative of the direction to be taken by the vessel. The direction in which the vessel is to be steered is set by rotating the bowl 12 in relation to the card 10. The card 10 has mounted thereon an inductor 15, a capacitor 16 and a resistor 17 connected in series to form a closed tuned circuit of predetermined frequency. The disposition of the inductor 15 is such that it is inductively coupled to a further inductor 14 mounted on the compass bowl 12, relative movement between the card 10 and the bowl 12 giving rise to changes in the degree of coupling between the two inductors 14 and 15.

The inductor 14 is connected to form part of the oscillatory circuit (not shown) of a valve oscillator, the output of which is applied to operate the vessel steering mechanism.

The tuned circuit carried by the compass card will, due to departure of the vessel from the set course, impose a larger or smaller load on the oscillator according to the relative positions of the inductors 14 and 15, and these variations in load will cause variations in the signals fed to actuate the steering mechanism. The arrangement is such that while the vessel is on its set course the steering mechanism is not actuated, but a departure from the set course results in actuation of the steering mechanism to apply a steering correction to bring the vessel back on to the set course.

The compass card preferably has the form shown in FIGURES 2 and 3, wherein the circuit elements corresponding to elements 15, 16 and 17 are produced by a circuit printing technique. Any circuit printing technique can be used for the production of the card and not only that described below. One method of producing the card employs a laminated sheet comprising a thin, nonbrittle layer of a dielectric material sandwiched between two thin layers of copper foil bonded, e.g. by a suitable cement, to the centre layer. The parts of the copper layers that are to form the circuit are coated with a protective layer of, for example, a greasy ink and the uncoated remainder of the layers is etched away, for example by an aqueous ferric chloride solution.

The resulting card comprises two capacitor sections connected in parallel with one another, and together constituting the capacitor 16, and two inductor sections connected in series with one another and in series with the parallel-connected capacitor sections, the two inductor sections together consituting the secondary inductive coil 15. The resistor 17 is constituted by the resistance of the inductor sections, the capacitor sections and the connecting leads. The card 10 is circular and a circular portion 113 at the centre is clear of copper, except for a small dot 114 indicating accurately the position of the axis of rotation of the card. Two arcuate capacitor plate sections 115A, 116A and 115B, 116B respectively are mounted on each face of the card symmetrically about the axis of rotation, the plate sections 115A and 116A on one face being disposed in register, as seen in plan, with plate sections 115B and 116B respectively on the opposite card face, the two plates in register forming a single capacitor with the material of the card as the dielectric.

Two spirals 117A, 117B and 118A, 118B respectively each constituting one half of an inductor section are also mounted on each face of the card, each spiral being disposed between two immediately adjacent radial edges of the arcuate capacitor plate sections on the same face of the card. The two spirals on each face are thus disposed diametrically opposite to one another and symmetrically about the axis of rotation of the card. The two spirals on opposite faces of the card e.g. 117A and 117B and which together constitute a single inductor section are joined together at their centres by perforating the card and allowing a drop of solder 119 and 120 respectively to extend through the perforation in good electrical contact with both spirals. The leads 121 and 122 connecting the plates sections and the spirals together to form the oscillatory circuit are also disposed symmetrically about the axis of rotation.

It is found that cards in accordance with the present invention are inherently balanced and balance tests and corrections are not necessary. The dimensions of the card, plates and spirals etc. are such that the circuit is resonant at the required frequency. Indicia such as 123 showing, for example, the points of the compass can be produced on the card as an integral part thereof, either by etching away a patch of copper of the required shape, or by leaving a patch of copper of the required shape with a clear surround, whichever is the more convenient. Points of attachment such as 124 of members to the card (e.g. bar magnets in the case of a magnetic compass card), or of the card to other members, can be indicated accurately by patches of copper or clear patches in the copper, as desired.

We claim:

1. In automatic steering apparatus, signal generating means comprising a direction maintaining device in the form of a magnetic compass having a compass card comprising a sheet of an electrically insulating material mounted for rotation about an axis passing transversely through the sheet at the center thereof, a capacitor carried by said card and comprising two conducting plates supported in spaced parallel relation, said plates being formed of sections arranged symmetrically about the axis of rotation of said card, the sections of at least one plate being arranged in face-to-face relation with said sheet, an inductor carried by said card and comprising flat coil sections mounted in face-to-face relation with said sheet, said coil sections being disposed symmetrically about said axis of rotation, and means connecting said capacitor and said inductor together to form a closed tuned circuit.

2. Apparatus according to claim 1, wherein the capacitively related plate sections are mounted on opposite faces of the sheet which is of a dielectric material.

3. A compass card for mounting in a compass bowl for relative rotation about an axis perpendicular to the card, said card comprising a sheet of electrically insulating material mounted for rotation about an axis passing transversely through the sheet at the center thereof, and a closed electrical circuit carried by said card and comprising conductors bonded to the surface of said sheet on at least one face thereof, the elements of said circuit being disposed symmetrically about the axis of rotation of the card.

4. A compass card according to claim 3, wherein said circuit includes a capacitive element in the form of a plate section on each face of the insulating sheet, the capacitive plate sections being in register when viewed in the direction of the axis of rotation and forming a capacitor section with the sheet serving as a dielectric.

5. A compass card according to claim 4, wherein said circuit includes a further capacitive element in the form of a plate section on each face of the insulating sheet, the further capacitive plate sections being in register when viewed in the direction of the axis of rotation and forming a second capacitor section with the sheet serving as a dielectric.

6. A compass card according to claim 5, wherein the capacitive plate sections on each face of the insulating sheet are in the form of equally dimensioned arcuate plate sections, concentric about the axis of rotation and so disposed and dimensioned as to leave equal diametrically opposite spaces between their adjacent ends.

7. A compass card according to claim 6, wherein said circuit further includes a flat spiral inductive element in each of said spaces, the inner end of each spiral element on one face being connected through the sheet to the inner end of the spiral element in register therewith on the other face, each pair of interconnected spiral elements together forming a single inductor section.

8. A compass card according to claim 7, wherein on one face other outer end of one spiral element is connected to a printed lead connecting two adjacent ends of the capacitor plate sections on that face and the outer end of the other spiral element is connected to a further printed lead and wherein on the other face the outer end of the spiral element diametrically opposite said one spiral element is connected to a printed lead connecting the adjacent ends of the capacitor plate sections on the said other face and the outer end of the remaining spiral element is connected to a further printed lead, the further printed lead on each face extending symmetrically with respect to the axis of rotation of the card and being electrically connected together through the sheet of insulating material.

9. A compass card according to claim 8, wherein said circuit is so printed as to provide a central circular area concentric with the axis of rotation, which area has no conducting material thereon apart from a small dot thereof to mark said axis of rotation.

10. A compass card according to claim 9, wherein azimuth indicia are printed on one face of the card in the same metal as the circuit elements.

11. A compass card according to claim 3, wherein the circuit elements are formed by etched copper foil secured to the sheet of insulating material.

12. A compass card according to claim 3, wherein said circuit forms a closed oscillatory circuit.

13. Apparatus according to claim 1 and including a compass bowl on which said compass card is rotatably mounted, and an inductor coil mounted on said bowl at a point removed from the axis of rotation of said compass card and inductively coupled to one of the inductor sections on the compass card.

14. A compass card according to claim 3 and including a permanent magnet carried by said card and turning with it.

References Cited in the file of this patent

UNITED STATES PATENTS

| | | |
|---|---|---|
| 1,647,474 | Seymour | Nov. 1, 1927 |
| 2,407,536 | Chapman | Sept. 10, 1946 |
| 2,452,609 | Somers et al. | Nov. 2, 1948 |
| 2,490,735 | Kliever | Dec. 9, 1949 |
| 2,518,258 | Schulte | Aug. 8, 1950 |
| 2,741,733 | Noxon et al. | Apr. 10, 1956 |
| 2,776,428 | Hassler et al. | Jan. 1, 1957 |
| 2,800,292 | Moseley | July 23, 1957 |
| 2,812,487 | Hecht et al. | Nov. 5, 1957 |
| 2,838,258 | Noxon et al. | June 10, 1958 |

FOREIGN PATENTS

| | | |
|---|---|---|
| 649,398 | Great Britain | Jan. 24, 1951 |